Aug. 26, 1958
E. E. ANDERSON
2,849,045
WHEEL COVER
Filed Jan. 7, 1957
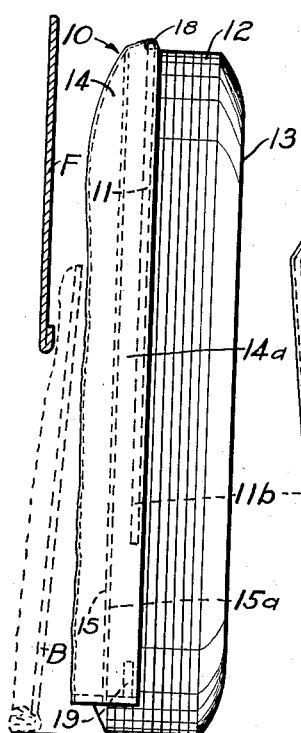
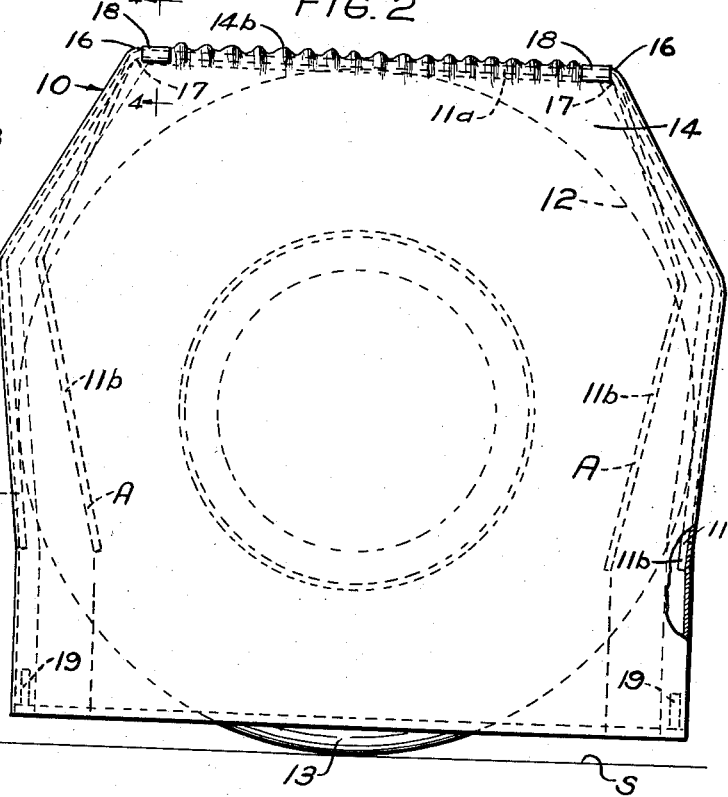
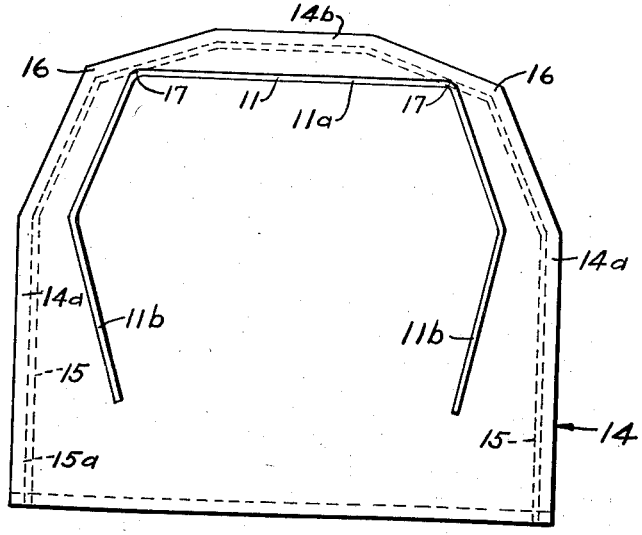
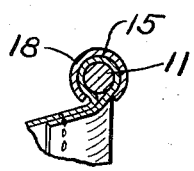
INVENTOR.
ELMER E. ANDERSON
BY Williamson, Schroeder,
Adams + Meyers
ATTORNEYS

United States Patent Office 2,849,045
Patented Aug. 26, 1958

2,849,045

WHEEL COVER

Elmer E. Anderson, Two Harbors, Minn.

Application January 7, 1957, Serial No. 632,741

3 Claims. (Cl. 150—54)

This invention relates to a wheel cover and more particularly relates to a cover to be applied onto an automobile wheel to protect the same when adjacent fender and body portions are being painted.

Although covers have been used on wheels in the past for this and other purposes, substantially all such covers have had several distinct disadvantages. The primary disadvantage of most covers is that they are difficult to apply properly to and remove from a wheel, particularly where a fender skirt hangs down quite low in immediate proximity with the wheel.

Therefore, with the foregoing in mind, it is to the elimination of this and other disadvantages that my present invention is directed, along with the provision of other new and novel features.

An object of my invention is to provide a new and improved wheel cover of simple and inexpensive construction and operation.

Another object of my invention is the provision of a wheel cover having a frame which is readily and easily applicable to and removable from the peripheral tread portion of a wheel for holding a cover sheet in overlying relation with the outer side of the wheel to be protected.

A further object of my invention is the provision of a wheel cover which may be cheaply constructed of a frame and a single piece of flat pliable sheet material which is formed and applied to the frame in such a manner that the necessary fullness is provided as to thoroughly cover the outer sidewall and portions of the tread and also provide for easy applying and removing the cover to and from the wheel.

These and other objects and advantages of my invention will more fully appear from the following description made in connection with the accompanying drawings wherein like reference characters refer to the same parts throughout the several views and in which:

Fig. 1 is an end elevation of the cover applied to an automobile wheel and showing a portion of a fender skirt;

Fig. 2 is a front elevation view of the cover applied to the automobile wheel;

Fig. 3 is a plan view of the cover member laid out flat and detached from the frame, and the frame overlying the cover member to show the relative shape and size of these parts; and Fig. 4 is a detail section view taken substantially at 4—4 in Fig. 2.

One form of the invention shown in the accompanying drawings and is described herein. The cover, which is indicated in general by numeral 10 includes an elongated frame member 11 which is constructed of yieldable and resilient material rod. The frame member 11 has an intermediate portion 11a which is substantially straight and which is adapted to lie upon the tread 12 of tire 13, which along with the hub defines the automobile wheel. The frame member 11 also has a pair of depending end portions or legs 11b which are spaced from each other and extend in a downwardly convergent direction in relation to each other for engaging the tread 12 of tire 13 at positions below a horizontal diameter of the tire. The lower terminal ends of end legs 11b are disposed in widely spaced relation above the bottom of the tire 13 or above the surface S upon which the wheels are supported. The upper portions of the depending legs 11b converge in an upward direction and are obliquely disposed with relation to the lower end portions of legs 11b and also in relation to the intermediate portion 11a so as to generally follow the peripheral shape of the tire.

The wheel cover 10 also includes a cover member which is indicated in general by numeral 14 and which, in the preferred form is constructed of a single piece of flexible or pliable sheet material which is impervious to passage of paint spray and the like therethrough and may in one form be constructed of canvas. The cover member 14 has a continuous hem 15 formed in the opposite side edge portions 14a and the top edge portion 14b for carrying the generally U-shaped frame member 11 therein. Hem 15 is secured as by stitching 15a. It will be noted that the lower portions of the opposite sides 14a of the cover member are parallel in relation to each other and in the construction extend along the straight edge of the goods. The top edge portion 14b protrudes upwardly from the end points thereof which are designated by numeral 16 and is substantially symmetrical about a longitudinal center of the cover member and is generally convex in shape in relation to the shape of the intermediate portion 11a of frame 11 upon which the upper edge portion 14b is applied when the frame is assembled with the cover member. As best seen in Fig. 2, the upper edge portion 14b of the cover member is gathered onto the intermediate portion 11a of the frame and the points 16 of the cover member are at the points 17 of the frame member when the upper edge portion 14b is properly gathered. The upward protrusion of the upper edge portion 14b, see Fig. 3, above the points 16 provide the necessary fullness when the cover member and frame are assembled so that the cover member will wrap around a portion of the tread and sidewall at the top of the wheel and be readily applied thereto and removed therefrom. Because, as seen in Fig. 3, the cover member 14 is substantially wider than the frame, additional puckering of the material is necessary on the intermediate portion 11a of the frame member and fullness of the cover is provided adjacent the depending legs 11b so that the cover will neatly wrap around the tread and sidewall of the tire at the opposite sides thereof.

Means are provided for securing the top edge portion 14b in gathered or puckered condition on the intermediate portion 11a of the frame and in the form shown, such means include a pair of resilient clips 18 which are secured around the hem 15 of the cover member and around the frame member 11 adjacent the opposite ends of the intermediate portion 11a thereof, and in immediate proximity with the points 16 and 17 on the cover member and frame respectively.

It will be noted that the cover member 14 hangs downwardly substantially below the lower terminal ends of frame legs 11b and extends into close proximity with the bottom of the tire and the surface upon which the tire rests. Weights 19 are provided in the two lower corners of the cover member 14 to hold the downwardly extending skirt portion adjacent the tire 13.

When the wheel cover 10 is in relaxed condition, that is, when the cover is detached from a tire, the frame assumes the position shown in Fig. 3 and the dotted position A shown in Fig. 2. The upper edge portion of the cover 10 is then inserted upwardly between the fender F of the automobile and the wheel and the intermediate portion 11a of the frame member is moved part way over the tread 12 of the tire at the top thereof. The fullness in the cover member adjacent the upper edge portion 14b thereof allows the cover member to assume substantially the shape of the tire tread and sidewall so as to hang thereover. The depending legs 11b of the frame are flexed outwardly from the dotted position A thereof to the tread 12 of the tire at the opposite sides thereof and are then placed in substantially the position shown in Fig. 1. The cover member has the necessary fullness for wrapping around the tread and sidewalls of the tire adjacent the depending legs 11b and the cover will hang into close proximity with the bottom of the wheel. Of course the weights 19 will hold the bottom portion of the cover member down adjacent the supporting surface.

In removing the cover 10, the depending legs of the frame will be gripped and spread slightly and the cover may be easily lifted off the tire and slipped downwardly between the fender and wheel. The lower edge of the fender skirt F may be disposed somewhat lower in some automobiles than in others, and because the lower terminal ends of the frame member 11 are disposed well above the bottom of the tire, the cover 10 may be inclined or tilted substantially as shown in dotted position B thereof in Fig. 1 so as to facilitate easy sliding of the cover into position on the tire and off the tire. The resilient rod frame may be flexed slightly if necessary to facilitate ready and easy application of the cover to the wheel.

It should be particularly noted that because of the characteristic shape of the frame 11, the leg portions 11b thereof need only be flexed outwardly slightly when the cover is being applied to and removed from the wheel. The surfaces of the automobile body closely adjacent the wheel do not interfere with the application and removal of the cover to and from the wheel.

It should also be particularly noted that the cover member 14 is of one-piece construction and that when the cover member is assembled with the frame member, the cover member has only the necessary fullness necessary to facilitate ready and easy application of the cover to the tire and removal of the cover therefrom. The entire operation of applying the cover to the wheel and removing the cover therefrom can be accomplished from the front side of the wheel and can be accomplished from a position beneath the edge of the fender skirt.

It is believed necessary to also note that the cover is readily reversible so that it may be applied to a wheel without regard for proper orientation of the fabric sheet material and frame in relation to the wheel. The fullness of the sheet material facilitating wrapping thereof around the tire sidewall is kept at a minimum so that the fullness may be swung from one side of the frame to the other as the cover is being applied to a wheel.

It will, of course, be understood that various changes may be made in the form, detail, arrangement and proportion of the parts without departing from the scope of my invention which consists of the matter described herein and set forth in the appended claims.

What is claimed is:

1. A cover applicable to a wheel of an automobile, comprising a resilient rod frame having an intermediate portion engageable with the tire tread at the top of the wheel and also having opposite depending end portions spaced from each other and converging in a downward direction at a position below a horizontal diameter of the wheel for engaging the tire tread at the opposite sides of the wheel at a position below a horizontal diameter thereof, the ends of the rod frame being disposed in widely spaced relation upwardly from a horizontal plane at the bottom of the tire tread, and a covering member constructed of flexible sheet material and secured to the end and intermediate portions of the frame in overlying and protecting relation with the outer face of the wheel, said covering member extending downwardly from the ends of the frame into close proximity with the horizontal plane at the bottom of the tire tread, whereby to adequately protect the wheel from paint spray and the like, yet facilitate ready and easy application and removal of the cover to and from the wheel.

2. A cover applicable to a wheel of an automobile, comprising a resilient rod frame having opposite end portions bent back upon themselves and spaced from each other for engaging the tire tread at the opposite sides of the wheel, said frame also having an intermediate portion engageable with the tire tread at the top thereof, and a covering member constructed of flexible sheet material and secured to the end portions and intermediate portion of the frame for overlying the outer face of the wheel in protecting relation, said covering member being gathered into puckers along the intermediate portion of the frame whereby to provide fullness in the cover member for wrapping around the sidewall and tread of the tire adjacent the opposite end portions of the frame, and means for holding the cover member in gathered relation along the intermediate portion of the frame.

3. A cover applicable to a wheel of an automobile, comprising a resilient rod frame having downwardly extending opposite end portions bent back upon themselves and spaced from each other for engaging the tire tread at the opposite sides of the tire, said frame also having an upper intermediate portion with a predetermined shape and being engageable with the tire tread at the top of the wheel, and a cover member constructed of flexible sheet material for overlying the wheel in protecting relation, said cover member having opposite side edge portions carried on the depending end portions of the frame, and also having a top edge portion with a generally convex shape in relation to the shape of the frame intermediate portion, the top edge portion of the cover member being substantially longer than the intermediate portion of the frame and being gathered into puckered relation on the intermediate portion of the frame and means for holding the top edge portion of the cover member in puckered relation on the intermediate portion of the frame, whereby to provide necessary fullness in the cover member for wrapping around the tire sidewall and tread at the top and opposite sides of the tire.

References Cited in the file of this patent

UNITED STATES PATENTS

| | | |
|---|---|---|
| 1,028,057 | Naylor | May 28, 1912 |
| 1,182,994 | Draver | May 16, 1916 |
| 1,370,549 | Newton | Mar. 8, 1921 |
| 1,472,033 | Anderson | Oct. 30, 1923 |
| 1,504,907 | Sandusky | Aug. 12, 1924 |
| 1,533,970 | Campbell et al. | Apr. 14, 1925 |
| 1,557,943 | Musto | Oct. 20, 1925 |
| 1,967,522 | Wengard | July 24, 1934 |
| 2,718,912 | Zimmerman | Sept. 27, 1955 |